(12) United States Patent  
Nishi

(10) Patent No.: US 11,193,758 B2  
(45) Date of Patent: Dec. 7, 2021

(54) MEASURING DEVICE AND SHAPING DEVICE

(71) Applicant: Ryohsuke Nishi, Kanagawa (JP)

(72) Inventor: Ryohsuke Nishi, Kanagawa (JP)

(73) Assignee: RICOH COMPANY, LTD., Tokyo (JP)

(*) Notice: Subject to any disclaimer, the term of this patent is extended or adjusted under 35 U.S.C. 154(b) by 0 days.

(21) Appl. No.: 16/814,359

(22) Filed: Mar. 10, 2020

(65) Prior Publication Data
US 2020/0300616 A1    Sep. 24, 2020

(30) Foreign Application Priority Data

Mar. 18, 2019    (JP) .............................. JP2019-050516

(51) Int. Cl.  
*G01B 11/24* (2006.01)  
*B29C 64/386* (2017.01)  
(Continued)

(52) U.S. Cl.  
CPC .............. *G01B 11/24* (2013.01); *B29C 64/20* (2017.08); *B29C 64/386* (2017.08); *G01B 11/25* (2013.01);  
(Continued)

(58) Field of Classification Search  
CPC . G01B 11/24; G01B 11/2408; G01B 11/2416; G01B 11/2425; G01B 11/25;  
(Continued)

(56) References Cited

U.S. PATENT DOCUMENTS

| 8,454,879 B2 * | 6/2013 | Kuzusako .............. B33Y 30/00 264/401 |
| 9,233,470 B1 * | 1/2016 | Bradski ..................... G06T 7/60 |

(Continued)

FOREIGN PATENT DOCUMENTS

| DE | 102007063041 A1 | 7/2009 |
| JP | 2004-020536 | 1/2004 |

(Continued)

OTHER PUBLICATIONS

Graebling et al., "Optical high-precision three-dimensional vision-based quality control of manufactured parts by use of synthetic images and knowledge for image-data evaluation and interpretation," 2002, Applied Optics, vol. 41, No. 14, pp. 2627-2643 (Year: 2002).*

(Continued)

*Primary Examiner* — Gordon J Stock, Jr.  
(74) *Attorney, Agent, or Firm* — Harness, Dickey & Pierce, P.L.C.

(57) ABSTRACT

A measurement device is configured to measure a three-dimensional shape of an object for measurement. The measurement device includes a projector, an imager, an identifier, and a calculator. The projector is configured to project a plurality of light lines onto the object for measurement. The imager is configured to capture an image of the object for measurement on which the plurality of light lines are projected. The identifier is configured to identify a projection condition of the light lines based on shaping information of the object for measurement. The calculator is configured to calculate a plurality of line shapes from the image captured by the imager, based on the projection condition.

5 Claims, 6 Drawing Sheets

(51) Int. Cl.
  *B29C 64/20* (2017.01)
  *G01B 11/25* (2006.01)
  *B33Y 30/00* (2015.01)
  *B33Y 50/00* (2015.01)
(52) U.S. Cl.
  CPC ........... *G01B 11/2513* (2013.01); *B33Y 30/00* (2014.12); *B33Y 50/00* (2014.12)
(58) Field of Classification Search
  CPC ............ G01B 11/2513; G01B 11/2518; G01B 11/2531; G01B 11/2536; G01B 11/254; B29C 64/20; B29C 64/386; B29C 64/118; B29C 64/30; B29C 64/393; B33Y 30/00; B33Y 50/00; B33Y 50/02; G06T 7/0004; G06T 7/521
  See application file for complete search history.

(56) References Cited

U.S. PATENT DOCUMENTS

| | | | |
|---|---|---|---|
| 2008/0273194 A1 | 11/2008 | De Sloovere et al. | |
| 2009/0040533 A1 | 2/2009 | Takahashi et al. | |
| 2010/0328682 A1* | 12/2010 | Kotake | G06T 7/521 356/620 |
| 2012/0236317 A1 | 9/2012 | Nomura | |
| 2014/0036034 A1* | 2/2014 | Boyer | B33Y 50/02 348/46 |
| 2015/0206325 A1* | 7/2015 | Furihata | G01B 11/25 382/154 |
| 2015/0268035 A1* | 9/2015 | Furihata | G01B 11/254 348/136 |
| 2016/0069669 A1* | 3/2016 | Furihata | G06T 7/521 356/610 |
| 2016/0252346 A1* | 9/2016 | Bismuth | A41H 1/02 356/610 |
| 2016/0253815 A1* | 9/2016 | Tokimitsu | H04N 13/254 348/136 |
| 2016/0346882 A1* | 12/2016 | Yamazaki | B23P 19/04 |
| 2016/0375640 A1 | 12/2016 | Cho et al. | |
| 2017/0066192 A1 | 3/2017 | Cho et al. | |
| 2017/0266727 A1* | 9/2017 | Nishino | B22F 10/00 |
| 2017/0307366 A1* | 10/2017 | Tokimitsu | G01B 11/2513 |
| 2018/0058843 A1* | 3/2018 | Tabuchi | G01B 21/04 |
| 2018/0180408 A1* | 6/2018 | Du | G01B 11/2522 |
| 2018/0186082 A1* | 7/2018 | Randhawa | B23K 26/34 |
| 2019/0255776 A1 | 8/2019 | Cho et al. | |
| 2019/0275742 A1 | 9/2019 | Yorozu | |
| 2019/0278222 A1 | 9/2019 | Ishikawa | |
| 2019/0286104 A1 | 9/2019 | Sugawara et al. | |
| 2019/0299538 A1 | 10/2019 | Yorozu | |
| 2019/0323829 A1* | 10/2019 | Suenaga | G01B 11/2545 |
| 2019/0325593 A1* | 10/2019 | Tokimitsu | G06T 7/0012 |
| 2019/0392607 A1* | 12/2019 | Sasaki | G06T 5/50 |
| 2020/0001529 A1 | 1/2020 | Sugawara et al. | |
| 2020/0003553 A1* | 1/2020 | Nishi | B29C 64/393 |
| 2020/0105005 A1* | 4/2020 | Grassinger | G06T 7/579 |
| 2020/0156322 A1 | 5/2020 | Yorozu | |
| 2020/0230886 A1 | 7/2020 | Takano et al. | |

FOREIGN PATENT DOCUMENTS

| | | |
|---|---|---|
| JP | 5746529 | 5/2015 |
| JP | 2017-013288 | 1/2017 |
| JP | 2017-015456 | 1/2017 |
| JP | 2020-114630 A | 7/2020 |
| JP | 2020-138535 A | 9/2020 |

OTHER PUBLICATIONS

Machine translation of DE102007063041A1, 2009, pp. 1-40. (Year: 2009).*

Extended Search Report for European Application No. 20161460.9 dated Aug. 18, 2020.

* cited by examiner

PREDICTIVE PATTERN DATA

IMAGE DATA

IDENTIFYING PROJECTION CONDITION

MEASURING DEVICE AND SHAPING DEVICE

CROSS-REFERENCE TO RELATED APPLICATIONS

The present application claims priority under 35 U.S.C. § 119 to Japanese Patent Application No. 2019-050516, filed on Mar. 18, 2019. The contents of which are incorporated herein by reference in their entirety.

BACKGROUND OF THE INVENTION

1. Field of the Invention

The present invention relates to a measuring device and a shaping device.

2. Description of the Related Art

Currently, shaping devices or what is called three-dimensional printer devices (3D printer devices) for shaping three-dimensional objects based on input data are known in the art. Also, 3D printer devices including three-dimensional shape measurement functions for acquiring the shape/contours of the molded object are known in the art. Three-dimensional shape measuring functions exert minimal effects on the shaping process and therefore non-contact type three-dimensional shape measuring functions are often utilized. Non-contact type three-dimensional shape measurement functions such as the optical cutting method and pattern irradiating method are known.

Japanese Unexamined Patent Application Publication No. 2017-15456 discloses a measurement system capable of simultaneously irradiating the object for measurement with a plurality of slit laser lights and measuring the three-dimensional coordinates with good efficiency and high accuracy.

However, when acquiring the shape of the object for shaping, the measurement system of Japanese Unexamined Patent Application Publication No. 2017-15456 requires shortening the measurement time to avoid effects on the shaping process.

SUMMARY OF THE INVENTION

According to an aspect of the present invention, a measurement device is configured to measure a three-dimensional shape of an object for measurement. The measurement device includes a projector, an imager, an identifier, and a calculator. The projector is configured to project a plurality of light lines onto the object for measurement. The imager is configured to capture an image of the object for measurement on which the plurality of light lines are projected. The identifier is configured to identify a projection condition of the light lines based on shaping information of the object for measurement. The calculator is configured to calculate a plurality of line shapes from the image captured by the imager, based on the projection condition.

BRIEF DESCRIPTION OF THE DRAWINGS

The accompanying drawings are intended to depict exemplary embodiments of the present invention and should not be interpreted to limit the scope thereof. Identical or similar reference numerals designate identical or similar components throughout the various drawings.

DESCRIPTION OF THE EMBODIMENTS

Figure 1A:
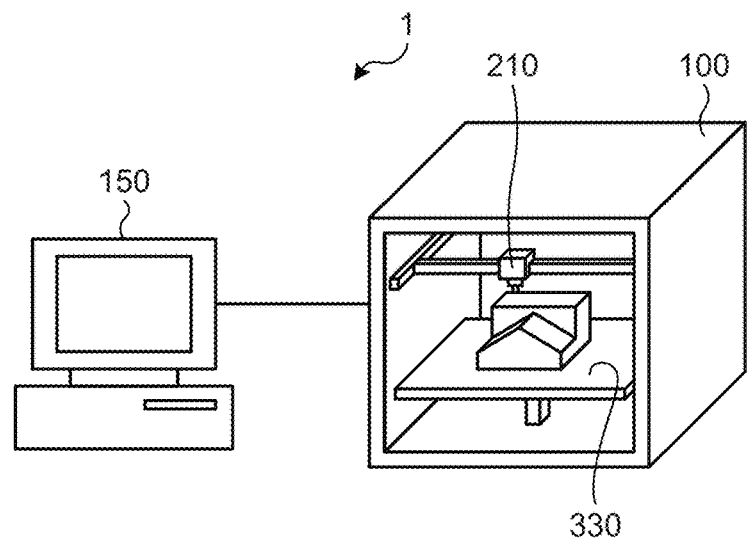
FIGS. 1A to 1C are system structural drawings of the 3D shaping system according to a first embodiment.

The terminology used herein is for the purpose of describing particular embodiments only and is not intended to be limiting of the present invention.

As used herein, the singular forms "a", "an" and "the" are intended to include the plural forms as well, unless the context clearly indicates otherwise.

In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result.

An embodiment of the present invention will be described in detail below with reference to the drawings.

An embodiment has an object to provide a shaping device and a measurement device capable of measuring the three-dimensional shape of the object for measurement with high speed and with high accuracy.

The embodiments of the 3D shaping system of the embodiments of the measuring device and shaping device are hereinafter described while referring to the accompanying drawings.

System Structure

Figure 1B:
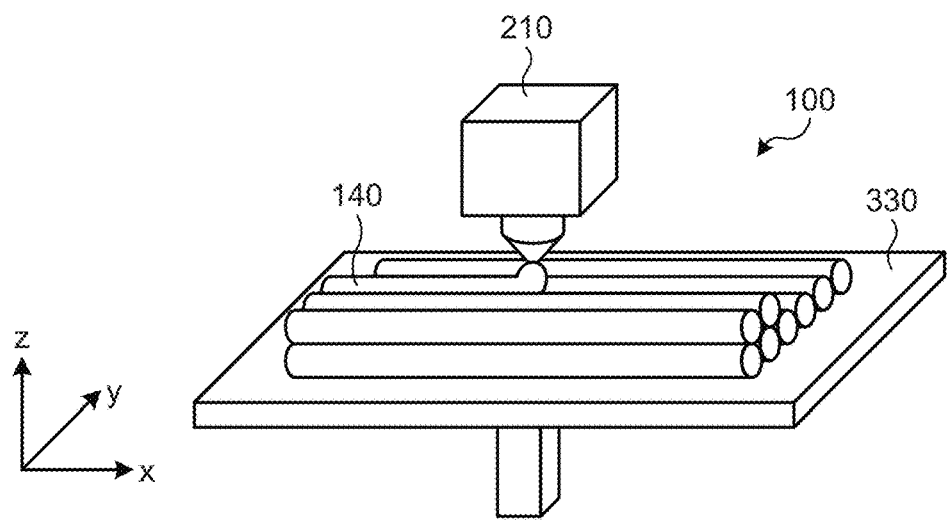
Figure 1C:
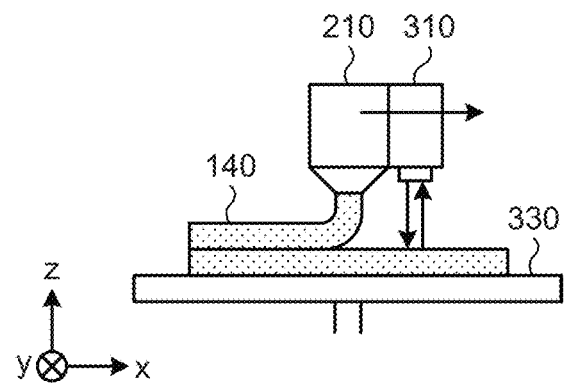

First of all, FIGS. 1A to 1C are system structural drawings of the 3D shaping system 1 according to a first embodiment. Hereafter, for purposes of convenience, the following description proceeds by referring to the height direction of the 3D object as the z axis direction, and the surface intersecting the z axis as the xy plane. Hereafter, the 3D shaping system 1 is described by the fused filament fabrication method using filament as one example of the shaping material however the present invention is not limited to this method and 3D shaping systems utilizing a variety of methods are allowable.

As illustrated in FIG. 1A, the 3D shaping system 1 includes a shaping device 100 that shapes the 3D object for shaping, and an information processing terminal 150. The information processing terminal 150 sends shape data for the 3D object for shaping to the shaping device 100. The shaping device 100 shapes the 3D object for shaping based on shape data for the object for shaping that is received from the information processing terminal 150.

The information processing terminal 150 may operate as a controller to control the processing to operate the shaping device 100, or the functions of this information processing terminal 150 may be embedded into the shaping device 100 for operation. Namely, the shaping device 100 and the information processing terminal 150 may be individually operated as physically separate devices, or integrally operated as the shaping device 100.

As illustrated in FIG. 1B, the shaping device 100 includes a shaper 210 capable of movement in parallel with the xy plane, and a shaping plate 330. The shaping device 100 dispenses shaping material (filament) 140 over the shaping plate 330 from the shaper 210 and forms a layered shape on the xy plane of the 3D object for shaping. The shaping device 100 shapes one layer of a shaping layer of the 3D object for shaping by drawing one-dimensional lines within the same plane.

When shaping of one layer of the shaping layer is complete, the shaping device 100 lowers the shaping plate 330 by just a one-layer height portion (lamination pitch) along the z axis direction. The shaping device 100 subsequently drives the shaper 210 the same as for the first layer to shape the second layer of the shaping layers. The shaping device 100 repeats these operations to form the layer laminations and shapes the 3D object for shaping.

The shaping device 100 moves the shaper 210 along the xy plane and as described by the example, moves the shaping plate 330 along the z axis. However, the above described structure does not limit the present embodiment and other structures may be utilized.

As illustrated in FIG. 1C, the shaping device 100 includes a shape sensor 310 as a measurement device for measuring the shaping layer during shaping or the shape of the 3D object after shaping. The shape sensor 310 measures dimensions of the x axis, the y axis, and the z axis directions of the 3D object for shaping, etc.

An infrared sensor, a camera device, or a 3D measurement sensor (e.g., optical cutting profile sensor) may for example be utilized as the shape sensor 310. In other words, the shaping device 100 also functions as a scanning device. In the first embodiment, an example of the 3D measurement sensor (e.g., optical cutting profile sensor) utilized as the shape sensor 310 is described.

As subsequently described using FIG. 3, the shape sensor 310 (optical cutting profile sensor) includes at least a projector 300 and an imager 301. The projector 300 projects a plurality of light lines onto the object for measurement. More specifically, the projector 300 projects pattern light rays onto the object for measurement. The imager 301 captures images of the objects for measurement that the projector 300 projects the light lines on. More specifically, the imager 301 acquires image data (camera images) of 2D images of the object for measurement that pattern light ray is projected upon.

As illustrated in FIG. 1C, the shape sensor 310 may measure the shape of the shaping layer while interlocked with the shaping operation for example of the shaper 210. The shape sensor 310 may measure the shape of the shaping layer as each single layer of the shaping layer is formed. The timing and range for the shape sensor 310 to measure the object for shaping can be optionally set.

Hardware Structure of the Information Processing Terminal

Figure 2:
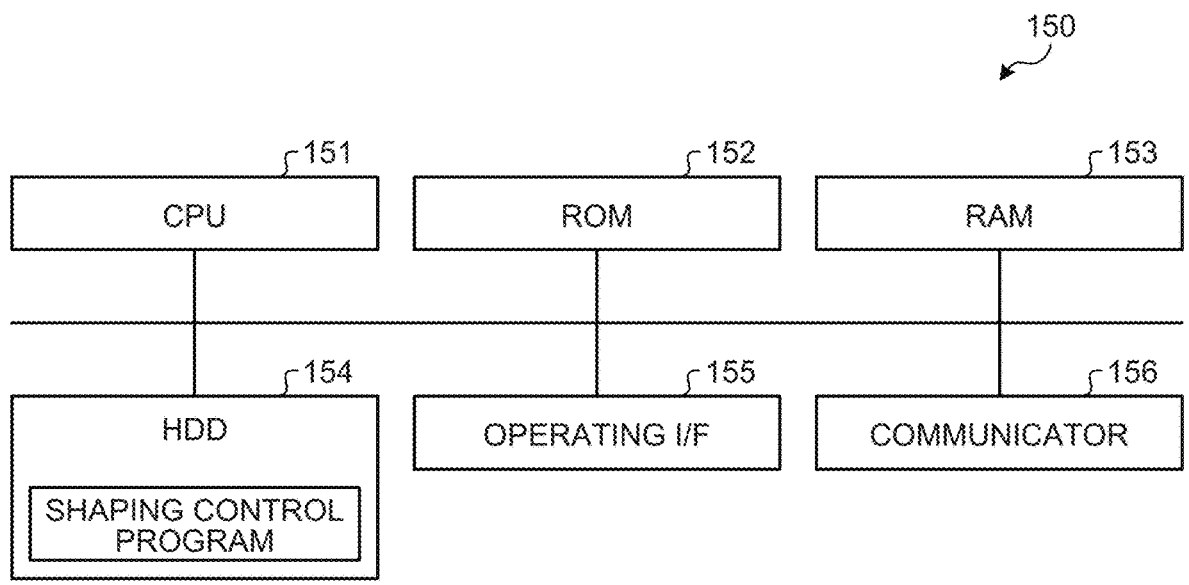
FIG. 2 is a hardware structural drawing of the information processing terminal installed in the 3D shaping system according to the first embodiment.

FIG. 2 is a structural drawing of the hardware for the information processing terminal 150. As illustrated in FIG. 2, the information processing terminal 150 includes a central processing unit (CPU) 151, a read only memory (ROM) 152, a random access memory (RAM) 153, a hard disk drive (HDD) 154, an operating interface (operating I/F) 155, and a communicator 156. A shaping control program that performs shaping control of the shaping device 100 is stored in the HDD 154.

Function of the Information Processing Terminal

Figure 3:
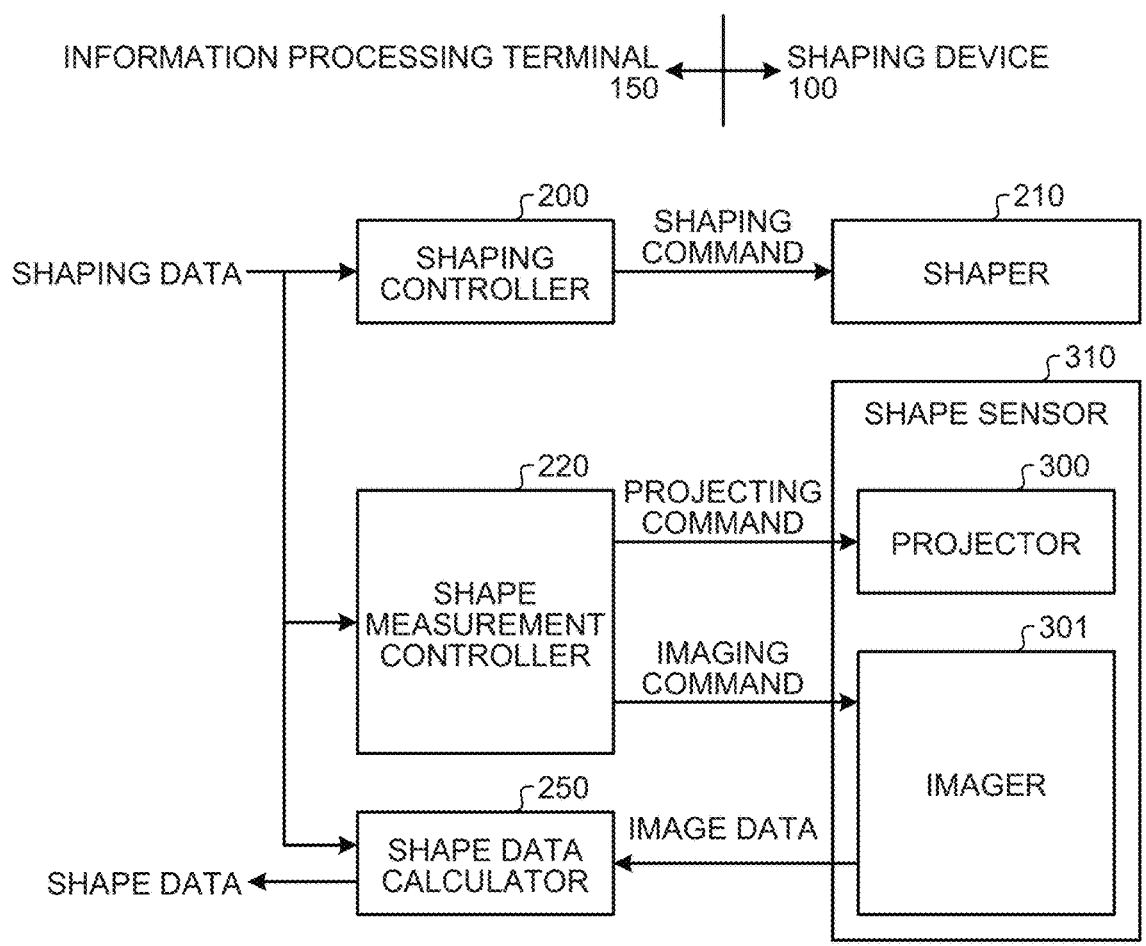
FIG. 3 is a function block diagram of each function implemented by the CPU of the information processing terminal by executing the shaping control program.

As illustrated in FIG. 3, the CPU 151 executes each function of a shaping controller 200, a shape measurement controller 220, and a shape data calculator 250 by executing the shape control program stored in the HDD 154.

The shaping controller 200 controls the shaping operation of the shaping device 100 based on the shape data. Specifically, the shaping controller 200 generates shaping commands based on the shape data and supplies the shaping commands to the shaper 210 of the shaping device 100. The shaping commands are commands stipulated by the shaper 210 and are generally commands that control the shaping process information for supplemental shaping.

The shape measurement controller 220 controls the shape sensor 310. Specifically, the shape measurement controller 220 first of all supplies irradiation commands to the projector 300 of the shape sensor 310 to irradiate the light lines onto the object for measurement. The projector 300 generates light rays in a linear state and projects them onto the object for measurement. As only a single example, in the case of the 3D shaping system 1 according to the first embodiment, a plurality of light lines are projected. By changing the irradiation angle of one light line, a projection state with the light lines may be projected, and the light lines may be generated by installing a plurality of light sources that project a single light line. The light lines may also be generated by utilizing a planar projector function.

The shape measurement controller 220 supplies imaging commands to the imager 301 of the shape sensor 310 to capture images of the object for measurement on which light lines are projected. The imager 301 captures images of the object for measurement on which the light lines are projected and supplies this image data to the shape data calculator 250. To capture the projected light lines as a single image, the shape measurement controller 220 generates imaging command for the imager 301 that are synchronized with projection commands to the projector 300.

The shape data calculator 250 calculates the shape data. The shape data calculator 250 is one example of an identifier and a calculator. The identifier identifies projection conditions for the light lines based on shaping information of the object for measurement. The calculator calculates a plurality of line shapes from the image captured by the imager based on the projection conditions. The shape data calculator 250 identifies patterns for the light lines in the image data by utilizing the shape data, and for example calculates 3D data (shape data) of the object for measurement by the optical cutting method.

Calculation Operation for Shape Data

Figure 4A:
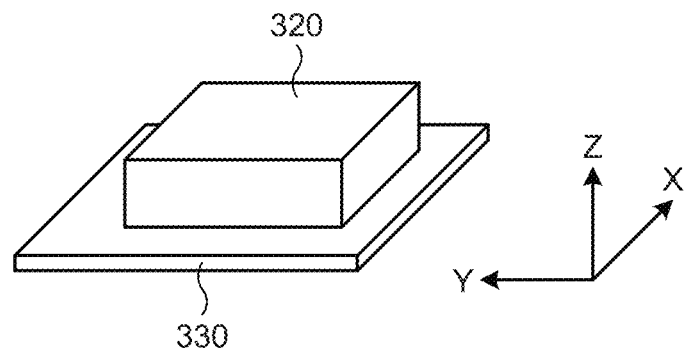
FIGS. 4A to 4C are drawings illustrating an example of the image of the object for measurement captured by the imager, on which a plurality of light lines are projected.
Figure 4B:
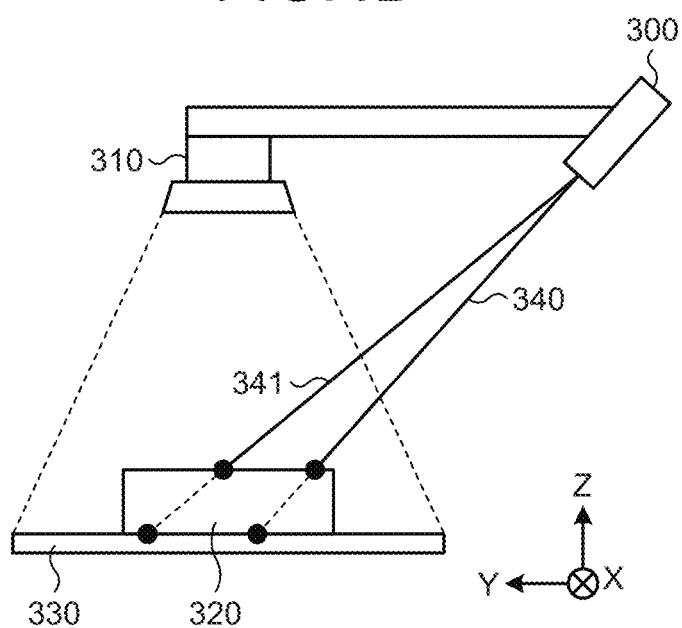
Figure 4C:
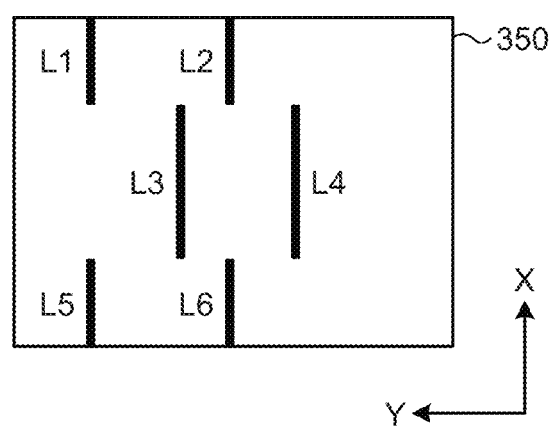

FIGS. 4A to 4C are drawings illustrating one example of the image of the object for measurement captured by the imager 301 and on which the light lines are projected. Among these, FIG. 4A illustrates an outer view of the object for measurement 320 formed on the shaping plate 330. In contrast to this type of object for measurement 320, as illustrated in FIG. 4B, the projector 300 projects the light lines 340, 341 (as one example, two light lines) onto the object for measurement 320 and the imager 310 performs image capture. The projector 300 projects two of the light lines 340 and the light line 341 that have different light conditions. This light line may be projected simultaneously or may be projected by time sharing for each condition. The number of light lines projected by the projector 300 is not limited to two lines.

The imager 310 captures images of the object for measurement 320 on which the light lines 340, 341 are projected and so can in this way generate image data 350 as illustrated for example in FIG. 4C. The shape data calculator 250 converts the image data 350 into distance data based on the what is called optical cutting method. Generally, when measuring distance using the optical cutting method, one light line is irradiated and the distance calculation processing is performed based on that image data.

In contrast, in the 3D shaping system 1 according to the first embodiment, images of the projected light lines 340, 341 can be acquired and the distance data of the light lines 340, 341 is calculated in one batch. Therefore, this calculation requires identifying irradiation conditions of the light lines from the projection patterns of the light lines contained in the image data 350. The shape data calculator 250 utilizes shape data to identify projection conditions of the light lines 340, 341 that are projected onto the object for measurement 320.

In other words, the object for measurement 320 is an object for shaping that is shaped by the shaping device 100 and therefore the shape data calculator 250 can acquire shape data acquired under ideal conditions in advance prior to measurement. The shape data calculator 250 also calculates the projected line pattern image (predictive pattern data) acquired when the light line for that ideal shape is projected. The shape data calculator 250 further calculates the predictive pattern data while adding the "assumed range of shape error" for error that is determined by the shaping performance of the shaping device 100.

Identifying Operation for Projection Conditions of Light Line

Figure 5A:
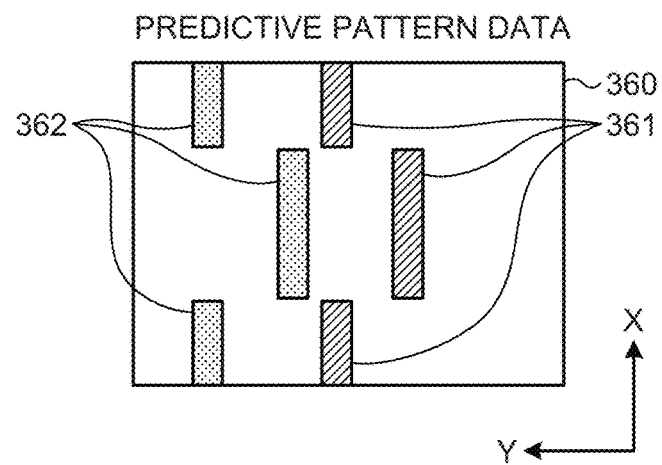
FIGS. 5A to 5C are drawings for describing the operation for identifying projection conditions of the light lines.
Figure 5B:
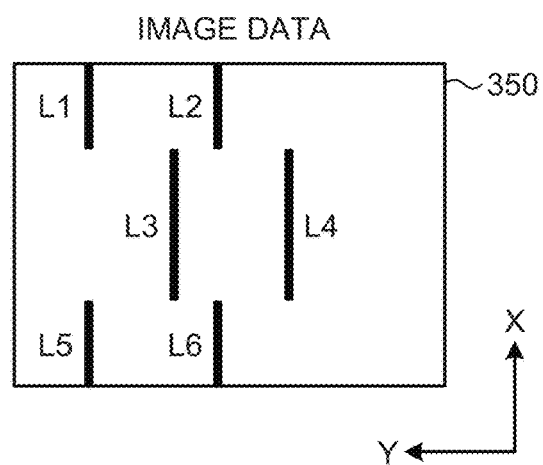
Figure 5C:
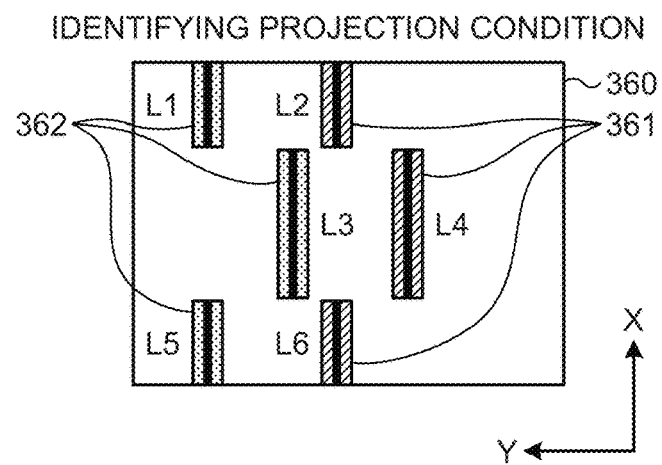

The operation for isolating and arranging the projection information of the light lines contained in the image data 350 and for identifying projection conditions of the light lines is described next. FIG. 5 includes drawings for describing the operation for identifying projection conditions of the light lines. As described above, the shape data calculator 250 generates a predictive pattern data 360 as illustrated for example in FIG. 5A that predicts the image observed under light lines projected for each of the projection conditions by way of the shape error within the assumed range and the ideal shape data for the object for measurement 320.

By projecting the two light lines 340, 341 on the object for measurement 320, the predictive patterns 361, 362 for two projection conditions can be obtained as illustrated in FIG. 5A. The predictive patterns 361, 362 include the error within the assumed range as described above. The width of the light lines is therefore larger than the observed light lines width.

In other words, the light lines 340 projected onto the object for measurement 320 under the first projection condition observed in the area 361 illustrated in FIG. 5A, can be predicted based on the predictive pattern. Specifically, by comparing the predictive pattern data, with the image data illustrated in FIG. 6B, the shape data calculator 250 can identify line L2, line L4, and line L6 as projection results from projecting the light lines 340 under a first projection condition. The shape data calculator 250 can in the same way, identify line L1, line L3, and line L5 as projection results from projecting the light lines 341 under a second projection condition.

The object for measurement 320 can in this way be shaped by the shaping device 100 based on shaping data so that projection conditions for the light lines 340, 341 projected onto the object for measurement 320 can be isolated using the shaping data. The shape data (Z direction, height data) of the lines can therefore be obtained in one batch based on one round of imaging data.

Advantageous Effects of First Embodiment

As clarified in the above description, the 3D shaping system 1 according to the first embodiment is capable of measuring two line shapes with one image data by using the light lines 340, 341 and without having to install new hardware for identifying projection conditions for the light lines. High-speed and low-cost shape measurement can therefore be achieved. The shape data calculator 250 can calculate distance data of the light lines 340, 341 in one batch and can therefore shorten the measurement time (speeding up).

Second Embodiment

The 3D shaping system according to a second embodiment is described next. In the case of the example for the 3D shaping system 1 according to the first embodiment, one projector 300 projects a plurality of light lines 340, 341. In contrast, in the example of the 3D shaping system according to the second embodiment, a plurality of projectors project one light line. The first embodiment described above and the second embodiment described below, differ only in this point. Therefore, only a description of the differences between both embodiments is given and redundant descriptions are omitted.

Figure 6A:
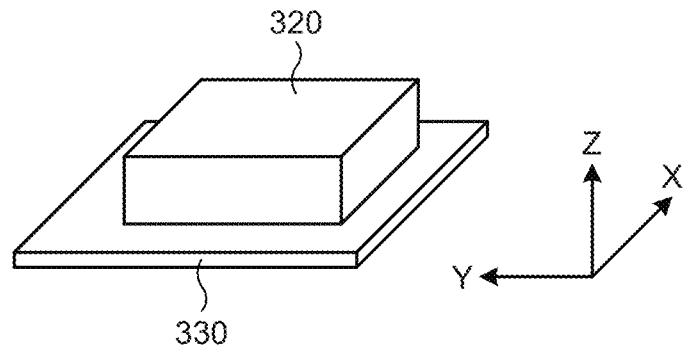
FIGS. 6A to 6C are drawings illustrating an image captured of the object for measurement by projecting the light lines in the 3D shaping system according to a second embodiment.
Figure 6B:
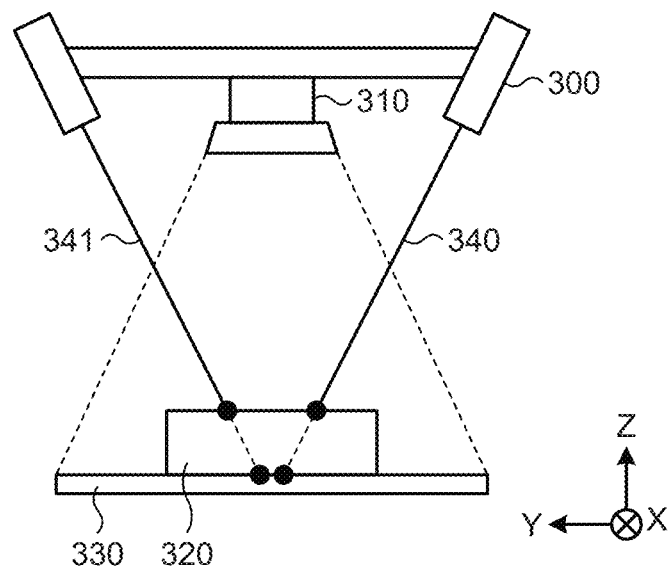

FIG. 6 includes drawings illustrating the captured image of the object for measurement by projection of the light lines in the 3D shaping system according to the second embodiment. Among these, FIG. 6A illustrates an outer view of the object for measurement 320 that is shaped on the shaping plate 330. In the case of the 3D shaping system according to the second embodiment as illustrated in FIG. 6B, there are for example two projectors 330. The light lines 340, 341 from the respective projectors 330 are projected onto the object for measurement 320, and an image is captured by the imager 310.

Figure 6C:
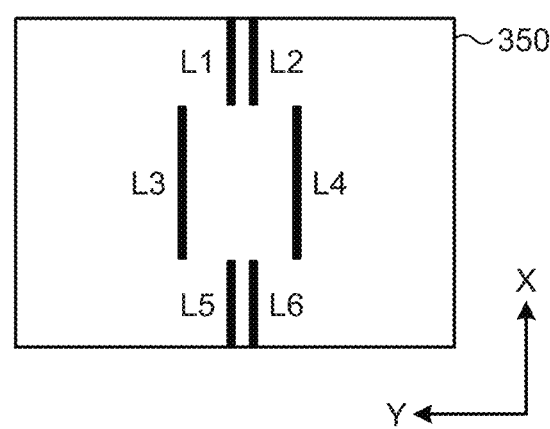

The shape data calculator 250 can identify line L2, line L4, and line L6 as projection results from projecting the light line 340 under a first projection condition by comparing the above described predictive pattern data, with the image data illustrated in FIG. 6C. The shape data calculator 250 can in the same way, identify line L1, line L3, and line L5 as projection results from projecting the light line 341 under a second projection condition.

This type of 3D shaping system according to the second embodiment, the same as the first embodiment described above, is capable of isolating the projection conditions for the light lines 340 and 341 projected onto the object for measurement 320 by utilizing the shaping data. The shape data (Z direction, height data) of the lines can therefore be obtained in one batch based on one round of imaging data to obtain the same effect as the first embodiment.

Third Embodiment

The 3D shaping system according to a third embodiment is described next. In the case of the example for the 3D shaping system according to the second embodiment described above, a plurality of projectors each project one light line. In contrast, in the 3D shaping system according to the third embodiment, a plurality of projectors each project a plurality of light lines. The second embodiment described above and the third embodiment described below, differ only in this point. Therefore, only a description of the differences between both embodiments is given and redundant descriptions are omitted.

Figure 7A:
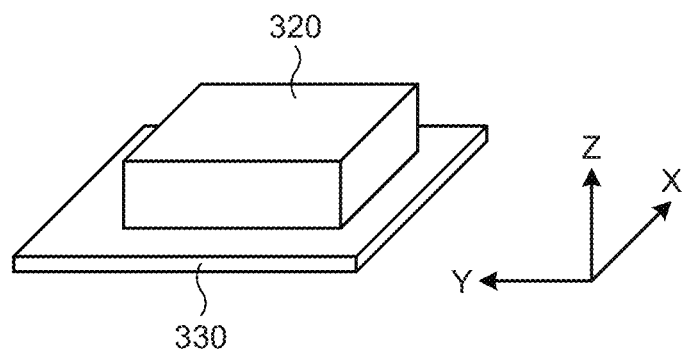
FIGS. 7A to 7C are drawings illustrating a captured image of the object for measurement by projecting the light lines in the 3D shaping system according to a third embodiment.
Figure 7B:
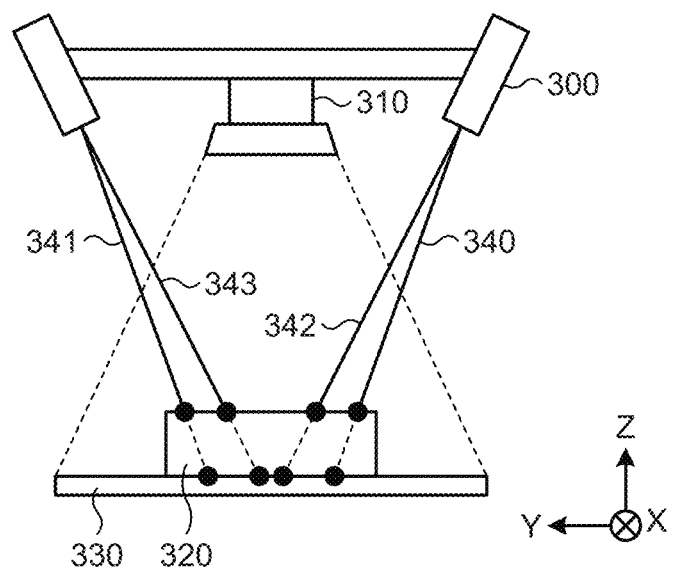
Figure 7C:
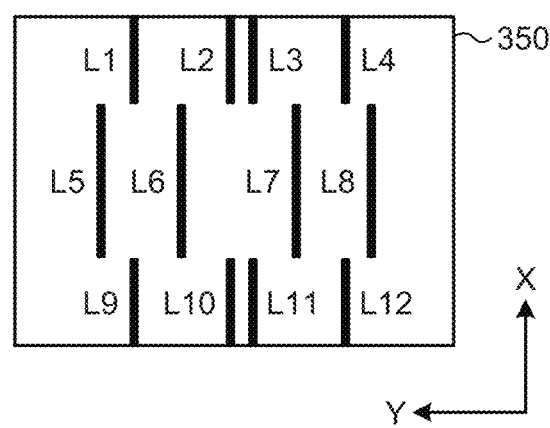

FIGS. 7A to 7C are drawings illustrating the image captured of the object for measurement by projection of light lines in the 3D shaping system according to the third embodiment. Among the drawings, FIG. 7A illustrates an outer view of the object for measurement 320 being shaped on the shaping plate 330. In the case of the 3D shaping system according to the third embodiment, there are for example two projectors 330 as illustrated in FIG. 7B. One projector 330 projects two light lines 340, 342 to the object for measurement 320, and the other projector 330 projects two light lines 341, 343 to the object for measurement 320. The imager 310 then captures images of the object for measurement 320 on which light from each light line 340 through 343 is projected.

The shape data calculator 250 can identify line L4, line L8, and line L12 as projection results from projecting the light line 340 under a first projection condition by comparing the predictive pattern data, with the image data illustrated in FIG. 7C. The shape data calculator 250 can identify line L3, line L7, and line 11 as projection results from projecting the light line 342 under a first projection condition.

The shape data calculator 250 can in the same way identify line L1, line L5, and line L9 as projection results from projecting the light line 341 under a second projection condition, and identify line L2, line L6, and line 10 as projection results from projecting the light line 343 under a second projection condition.

This type of 3D shaping system according to the third embodiment, the same as the second embodiment described above, is capable of isolating the projection conditions for the light lines 340 through 343 projected onto the object for measurement 320 by utilizing the shaping data. The shape data (Z direction, height data) for the lines can therefore be obtained in one batch based on one round of image data to obtain the same effect as each of the above described embodiments.

Finally, each of the above described embodiments is provided as a single example and is not intended to limit the range of the present invention. Each of these novel embodiments can be implemented in other various forms and all manner of omissions, substitutions, and changes may be implemented without departing from the scope and spirit of the present invention. Various three-dimensional shaping methods are known in the art for example such as the fused filament fabrication (FFF) method, material jetting method, binder jetting method, selective laser sintering (SLS) method (or selective laser melting (SLM) method), stereolithography (laser method or digital light projector (DLP) method), however, the present invention applies to all of these 3D shaping methods and the above described effects can be obtained in all of these cases. The embodiments and the modifications of the embodiments are included in the range and intent of the invention, and are also included in the range of the claims of the invention or a range consistent with the invention.

An embodiment renders the advantageous effect that measuring the three-dimensional shape of the object for measurement can be measured with high speed and good accuracy.

The above-described embodiments are illustrative and do not limit the present invention. Thus, numerous additional modifications and variations are possible in light of the above teachings. For example, at least one element of different illustrative and exemplary embodiments herein may be combined with each other or substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

The method steps, processes, or operations described herein are not to be construed as necessarily requiring their performance in the particular order discussed or illustrated, unless specifically identified as an order of performance or clearly identified through the context. It is also to be understood that additional or alternative steps may be employed.

Further, any of the above-described apparatus, devices or units can be implemented as a hardware apparatus, such as a special-purpose circuit or device, or as a hardware/software combination, such as a processor executing a software program.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, non-volatile memory, semiconductor memory, read-only-memory (ROM), etc.

Alternatively, any one of the above-described and other methods of the present invention may be implemented by an application specific integrated circuit (ASIC), a digital signal processor (DSP) or a field programmable gate array (FPGA), prepared by interconnecting an appropriate network of conventional component circuits or by a combination thereof with one or more conventional general purpose microprocessors or signal processors programmed accordingly.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

What is claimed is:

1. A measurement device configured to measure a three-dimensional shape of an object for measurement, the measurement device comprising:
    a projector configured to project a plurality of light lines onto the object for measurement;
    an imager configured to capture a single image of the object for measurement on which the plurality of light lines are projected; and
    processing circuitry configured to
        identify a projection condition of the light lines based on shaping information of the object for measurement, the projection condition includes predictive patterns of the light lines based on an ideal shape of the object and shape error; and
        calculate a plurality of line shapes from the single image captured by the imager, based on the projection condition.

2. The measurement device according to claim 1, wherein the projector comprises a plurality of projectors, and each of the plurality of projectors is configured to project a light line of the plurality of light lines onto the object for measurement.

3. The measurement device according to claim 1, wherein the projector comprises a plurality of projectors, and each of the plurality of projectors is configured to project at least two of the plurality of light lines onto the object for measurement.

4. The measurement device according to claim 1, wherein the processing circuitry is configured to calculate the plurality of line shapes using an optical cutting method.

5. A shaping device comprising:
   a shaper configured to perform three-dimensional shaping of an object for measurement based on shaping information; and
   a measurement device configured to measure a three-dimensional shape of the object for measurement;
   the measurement device comprising:
      a projector configured to project a plurality of light lines onto the object for measurement;
      an imager configured to capture a single image of the object for measurement on which the plurality of light lines are projected; and
      processing circuitry configured to
         identify a projection condition of the plurality of light lines based on the shaping information of the object for measurement, the projection condition includes predictive patterns of the light lines based on an ideal shape of the object and shape error; and
         calculate a plurality of line shapes from the single image captured by the imager based on the projection condition.

* * * * *